United States Patent [19]

Makeev et al.

[11] 4,040,318

[45] Aug. 9, 1977

[54] TRANSFER MACHINE FOR CUTTING ROLLED SHEET METAL

[76] Inventors: Boris Anatolievich Makeev, ulitsa Novgorodskaya, 6, kv. 29; Lev Mikhailovich Stepochkin, ulitsa Chernoglazovskaya, 11a, kv. 9; Garri Moiseevich Korot, ulitsa Timurovtsev, 25a, kv. 100; Vadim Ivanovich Batozsky, Moskovsky prospekt, 28, kv. 21; Alexandr Iosifovich Khodorov, Sadovy proezd, 1, kv. 89; Vitaly Ivanovich Zhuravlev, ulitsa Slinka, 14a, kv. 50; Adolf Grigorievich Eremenko, ulitsa 3 Internatsionala, 17, kv. 24, all of Kharkov, U.S.S.R.

[21] Appl. No.: 686,554

[22] Filed: May 14, 1976

[51] Int. Cl.² ............................................. B26D 5/20
[52] U.S. Cl. .......................................... 83/71; 83/91; 83/104; 83/157; 83/167; 83/277; 83/281; 83/364
[58] Field of Search .................. 83/80, 71, 86, 89, 90, 83/91, 94, 96, 102, 104, 157, 167, 277, 281, 364, 209, 210

[56] References Cited

U.S. PATENT DOCUMENTS

| | | | |
|---|---|---|---|
| 3,170,355 | 2/1965 | Neely, Jr. | 83/364 X |
| 3,415,149 | 12/1968 | Ziljberman et al. | 83/364 X |
| 3,830,121 | 8/1971 | Makeev et al. | 83/94 X |

*Primary Examiner*—J. M. Meister

[57] ABSTRACT

A transfer machine for cutting rolled sheet metal comprises a sheet loading arrangement, a feed mechanism for moving a sheet to the blades of guillotine shears, an arrangement for sorting and stacking cut-off blanks, and a program control system. The sheet loading arrangement comprises a receiving table which is fixedly mounted and located on the axis of the transfer machine, and a four-member linkwork with a sheet grip. The linkwork is constructed so as to provide for transferring a sheet from a stack onto the table of the feed mechanism along the axis of the machine, the sheet remaining parallel to the table of the feed mechanism during the transfer. Fitted on the table of the feed mechanism is a sensor responsive to the passage of the rearward sheet edge. This sensor provides for measuring the dimensions of blanks from the rearward sheet edge on the reverse stroke of the feed mechanism.

4 Claims, 16 Drawing Figures

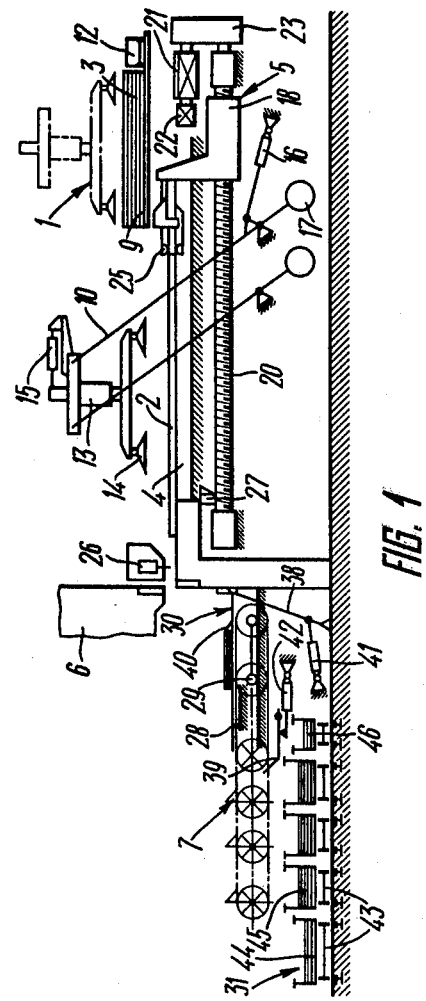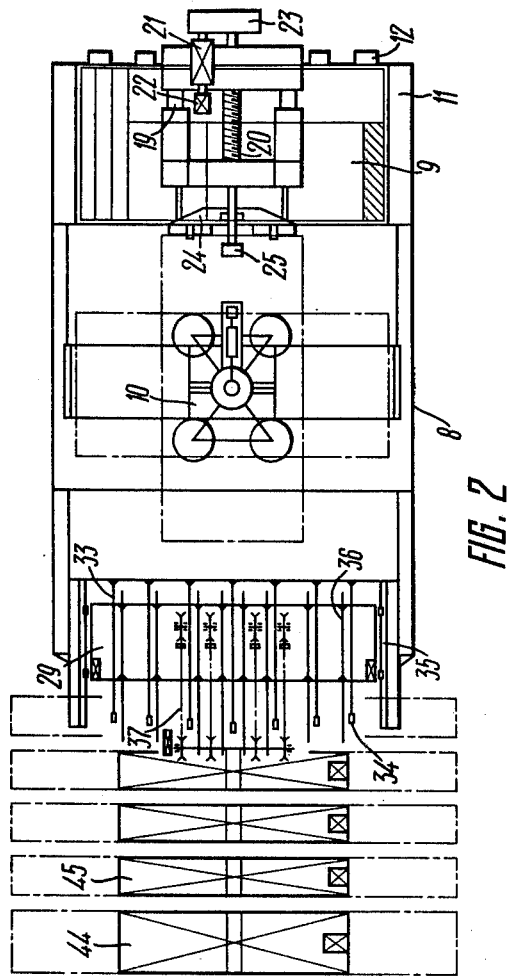

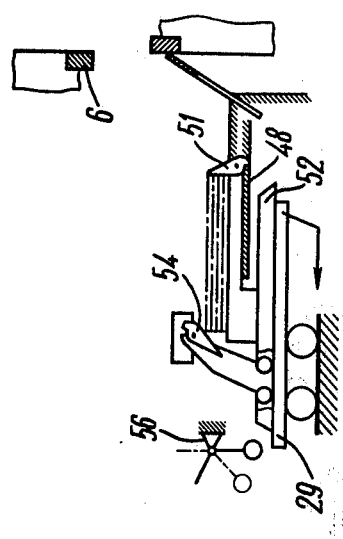
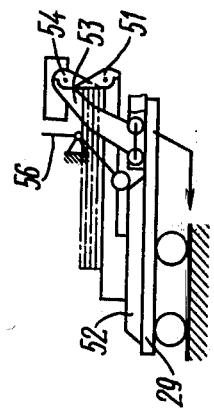
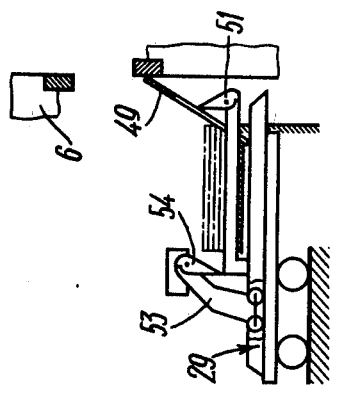
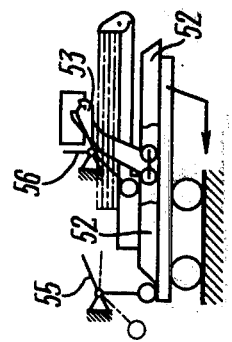

TRANSFER MACHINE FOR CUTTING ROLLED SHEET METAL

The present invention relates to equipment for mechanical working of metals and has particular reference to a transfer machine for cutting rolled sheet metal.

It is particularly advantageous to use this invention for cutting up rolled sheet metal according to combination economy patterns catering for little waste, though it may be used as well for cutting metal sheets into like blanks.

Known in the art is a sheet metal cutting installation comprising a sheet loading arrangement adapted to take a sheet from a stack and transfer it onto a feed table by the use of a gripping means, an arrangement for feeding the sheet to the blades of guillotine shears, and an arrangement for sorting out and stacking cut-off blanks.

The sheet loading arrangement includes an arm-type stacker and a receiving plate located away from the major mechanisms and adapted to be raised by a hydraulic ram cylinder.

The feed arrangement comprises a sensor for measuring off the dimensions of blanks from the forward edge of the sheet and a multisection storage arrangement which includes a section for large blanks. Ejectors for discharging blanks into the storage arrangement are located in the blank discharge zone.

The installation under review fully meets the requirements for automatic sheet cutting. However, the use of a separately located receiving plate and arm-type stacker considerably increases the cross dimensions of the installation, complicates the construction of the receiving plate and stacker, and results in a process flow which is not straight line.

Furthermore, the location of the large-blank section in the multisection storage arrangement increases the longitudinal dimension of the machine and lengthens the time of the automatic sheet cutting cycle, thereby reducing the working rate of the installation.

Measuring off the dimensions of blanks only from the forward edge of the sheet entails increased waste of the material.

The location of the blank ejectors in the discharge zone hinders the removal and unloading of the cut-off blanks from the storage sections and lengthens the duration of these operations.

It is the main object of the present invention to provide a transfer machine for cutting rolled sheet metal into blanks according to combination economy patterns which enables the operating process to be automated and a high working rate to be obtained.

It is a further and nowise less important object of the present invention to provide a transfer machine for cutting rolled sheet metal, which machine, in addition to the aforesaid features, has minimum dimensions.

It is a still further object of the present invention to provide a transfer machine for cutting rolled sheet metal, which machine, in addition to the aforesaid features, requires less attention than heretofore.

These and other objects are achieved in a transfer machine for cutting rolled sheet metal, comprising a sheet loading arrangement adapted to take a sheet from a stack and transfer it onto a feed table by the use of gripping means; a mechanism for moving the sheet on the feed table to the blades of guillotine shears; an arrangement for sorting out and stacking cut-off blanks, said arrangement including a receiving table for intermediate storage of like blanks, a trolley for transporting said blanks, and a mechanism for discharging the blanks into a multisection storage arrangement; and a program control system including sensors responsive to the position of the sheet and mechanisms.

According to the invention, the sheet loading arrangement comprises a receiving table fixedly mounted on a frame and located on the axis of the transfer machine. The sheet loading arrangement also comprises a four-member linkwork with a sheet grip, which linkwork is mounted on said frame and constructed in such a manner as to provide for transferring a sheet from a stack onto the table of the feed mechanism along the axis of the machine, the sheet remaining parallel to the plane of the feed table during the transfer. The feed table is also mounted on said frame and is equipped with a sensor responsive to the passage of the rearward edge of the sheet, said sensor providing for measuring off the dimensions of blanks from the rearward edge of the sheet on the reverse stroke of the feed mechanism. The longitudinal members of said frame serve as ways for the trolley on which is mounted the discharge mechanism adapted to carry cut-off blanks into the sections of the storage arrangement.

All the elements of the sheet loading arrangement, feed mechanism and sorting arrangement trolley are mounted on a common frame. The receiving table of the sheet loading arrangement is mounted above the feed mechanism drive. The four-member linkwork is mounted over the feed table. Such a constructional arrangement makes it possible to decrease the overall dimensions of the machine and to simplify the construction of the units involved.

The provision of a sensor for measuring off blank dimensions from the sheet rearward edge widens the technical capability of the machine, making it possible to minimize remnants.

The location of the discharge mechanism on the trolley improves access to the storage sections, simplifies blank unloading and decreases unloading time.

It is desirable that the frame of the transfer machine be composed of several sections located successively along the axis of the machine and designed for mounting the respective units thereof, viz. the receiving table of the sheet loading arrangement, the supports of the four-member linkwork, the feed table, and the trolley of the sorting arrangement. This construction facilitates the erection of the mechanisms in the transfer machine.

It is further expedient that the blank discharge mechanism should comprise a number of conveyors located on the trolley parallel to the axis of the machine, the driving elements of said conveyors being mounted on a common drive shaft for the conveyors to move synchronously. It is still further desirable that the carrying elements be provided with abutments for moving cut-off blanks from the receiving table into the storage sections, the receiving table being constructed in the form of a number of ribs arranged parallel to the axis of the machine and hinged at one end to the bed of the guillotine shears, which ribs are provided at the other end with rollers adapted to freely bear on the trolley. It is still further desirable that the discharge mechanism should comprise a pusher constructed in the form of a fork whose prongs fit between the ribs and extend up to the stationary blade of the guillotine shears, thereby forming a sloping surface for cut-off blanks to slide down onto the ribs, said pusher being rotatable for the purpose of moving blanks into the zone of action of the abutments. It is still further desirable that a trough be provided underneath the trolley, said trough being adapted to be moved out and turned for the purpose of directing remnants into one of the storage sections. This construction simplifies the making and maintenance of individual units and elements of the mechanism, frees the blank unloading zone, shortens the time taken to unload cut-off blanks, and makes it possible to use cranes as well as shop transport means (for example, fork lift trucks) for unloading blanks.

It is advisable that a trough for large blanks be provided above the discharge mechanism, said trough being mounted so that it can be moved along the axis of the machine, substantially parallel to the trolley, to arrive at two positions one of which is at the blades of the guillotine shears for the trough to receive large blanks, whereas the other is remote from said blades, making room for cut-off blanks to pass onto the ribs. This constructional arrangement reduces the longitudinal dimensions of the machine.

The reduction of the dimensions of the machine, the improvement in the maintenance requirements and the shortening of the blank unloading time can also be achieved with another embodiment of the discharge mechanism.

For this embodiment, it is desirable that the discharge mechanism comprise a carriage with rotatable ejectors, said carriage being mounted on the trolley for relative movement along the machine to permit the ejectors to push blanks off the trolley. It is further desirable that the discharge mechanism comprise a tracer mounted on the trolley and arranged to interact with a number of rotatable abutments located on the frame in the trolley path. The purpose of the first abutment is to stop the carriage during the movement of the trolley from the blades of the guillotine shears and thereby to cause the carriage to move relatively to the trolley into the initial position at which the ejectors pass beyond the ends of the blanks. The purpose of the other abutments is to stop the carriage and discharge the blanks into the multisection storage arrangement during the movement of the trolley toward the blades of the guillotine shears, the trolley being provided with spring-loaded catches adapted to remove the blanks from the receiving table and fix their ends during the movement of the carriage on the trolley into the initial position.

For a further understanding of the invention, an embodiment thereof will be described in detail with reference to the accompanying drawings, in which:

FIG. 1 is a general view of the transfer machine for cutting rolled sheet metal.

FIG. 2 is a top view of the transfer machine for cutting rolled sheet metal.

FIGS. 6 through 16 illustrate the sequence of blank discharge operations performed by the discharge mechanism constructed according to the embodiment comprising a carriage.

Figure 3:
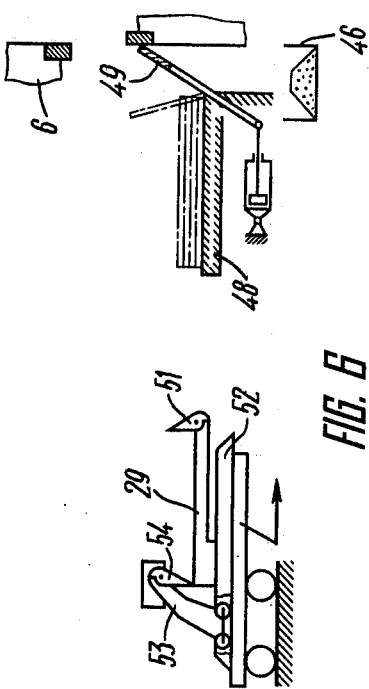
FIG. 3 shows the location of the trough for large blanks (side view).

The transfer machine for cutting rolled sheet metal comprises a sheet loading arrangement 1 (FIG. 1) adapted to take a sheet 2 from a stack 3 and transfer it onto a feed table 4; a feed mechanism 5 for moving the sheet 2 to the blades of guillotine shears 6; and a blank sorting and stacking arrangement 7.

The sheet loading arrangement 1 comprises a receiving table 9 and a four-member linkwork 10 which are mounted on a common frame 8.

The receiving table 9 is designed to carry the sheet stack and is constructed in the form of a platform. The position of the sheet stack is fixed by fences 11.

Also mounted on the platform are separating magnets 12 the function of which is to facilitate the unsticking of the top sheet from the stack. The magnets are mounted on rolls and are adapted to be brought to the end of the upper portion of the stack 3.

The four-member linkwork 10 comprises side members which are attached to cross members by means of hinges mounted on the frame 8. Mounted on the cross members is a pneumatic cylinder 13 (FIG. 1) from whose piston rod is suspended a grip 14 (for example, of the vacuum type) adapted to be turned in a horizontal plane through 90° by the action of a hydraulic cylinder 15. Hydraulic cylinders 16 are mounted on the linkwork side members for the purpose of turning the linkwork 10. To reduce the size of the cylinders 16 and the required amount of hydraulic oil, the side members are balanced by counterweights 17.

The feed mechanism 5 comprises a slide 18 adapted to be moved on two cylindrical guides 19 (FIG. 2) by the agency of a lead screw 20, a hydraulic booster 21, a step motor 22, and a reduction gear 23. Mounted on the slide 18 is a carriage 24 which has a front abutment and a grip 25 whose function is to grip and orientate the sheet being fed.

Near the cutting line of the guillotine shears 6 (FIG. 1) are fitted a sensor 26 for measuring blank dimensions from the blank forward edge and a sensor 27 for measuring blank dimensions from the blank rearward edge, the sensor 27 being mounted on the table 4 of the feed mechanism 5.

The sorting and stacking arrangement 7 comprises a receiving table 28 for cut-off blanks, a trolley 29 with a discharge mechanism 30 designed for discharging cut-off blanks into a multisection storage arrangement 31, and a trough 32 (FIG. 3) for large blanks.

The receiving table 28 is constructed in the form of separate ribs 33 (FIG. 2) hinged at one end to the bed of the guillotine shears 6, the other ends of the ribs being provided with rollers 34 adapted to freely bear on the trolley 29.

The trolley 29 is self-propelled. It is adapted for movement on ways 35 which also serve as longitudinal members of the common frame 8.

Mounted on the trolley are bars 36 which are arranged in the form of a fork and serve as ways for the rollers 34. The bars 36 are adapted to fit between the ribs 33 of the receiving table 28 at the approach of the trolley 29 to the guillotine shears 6.

The blank discharge mechanism 30 (FIG. 1) comprises a number of conveyors 37 (FIG. 2), a pusher 38 (FIG. 1) and a trough 39.

The conveyors 37 (FIG. 2) are located on the trolley 29 parallel to the axis of the transfer machine. The driving elements of the conveyors are mounted on a common drive shaft so as to ensure synchronous rotation of the conveyors 37.

To transport and discharge blanks, the pulling elements of the conveyors 37 are provided with abutments 40 (FIG. 1) which are mounted on the same straight line parallel to the blades of the guillotine shears 6.

The pusher 38 has the form of a fork. Its prongs fit between the ribs 33 (FIG. 2) of the receiving table 28 and extend to the stationary blade of the guillotine shears 6, thereby forming a sloping surface for blanks to slide down onto the ribs 33. The pusher 38 is operated by a pneumatic cylinder 41 (FIG. 1).

The trough 39 is located under the trolley 29 and is operated by two pneumatic cylinders 42. The function of the trough 39 is to deliver sheet remnants into the storage section nearest the blades of the guillotine shears 6.

The multisection storage arrangement 31 comprises floor-mounted self-propelled platforms 43 which carry blank containers 44 and 45, and a refuse bin 46.

The trough 32 (FIG. 3) for large blanks is located above the trolley 29 and is operated by a pneumatic cylinder 47.

According to another embodiment, the sorting and stacking arrangement 7 comprises a receiving table 48 (FIGS. 4 and 5) with a fence 49 provided thereon, a trolley 29 with a discharge mechanism 50 (FIG. 4), and a multisection storage arrangement 31.

The receiving table 48 (FIGS. 4 and 5) and the trolley 29 are each constructed in the form of a fork.

Figure 4:
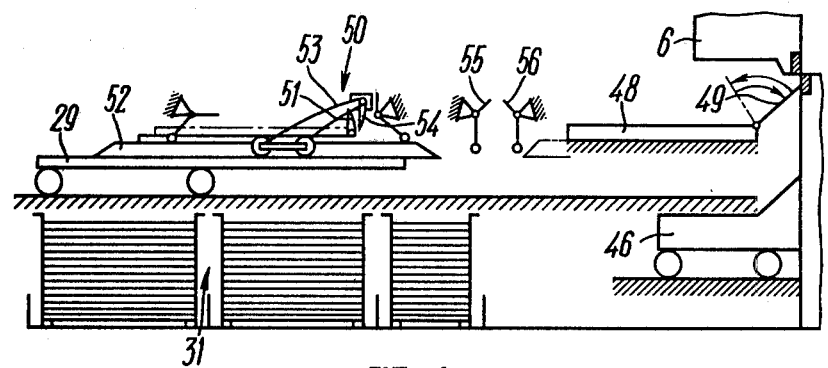
FIG. 4 is a side view of the blank sorting arrangement with the discharge mechanism (the embodiment comprising a carriage).
Figure 5:
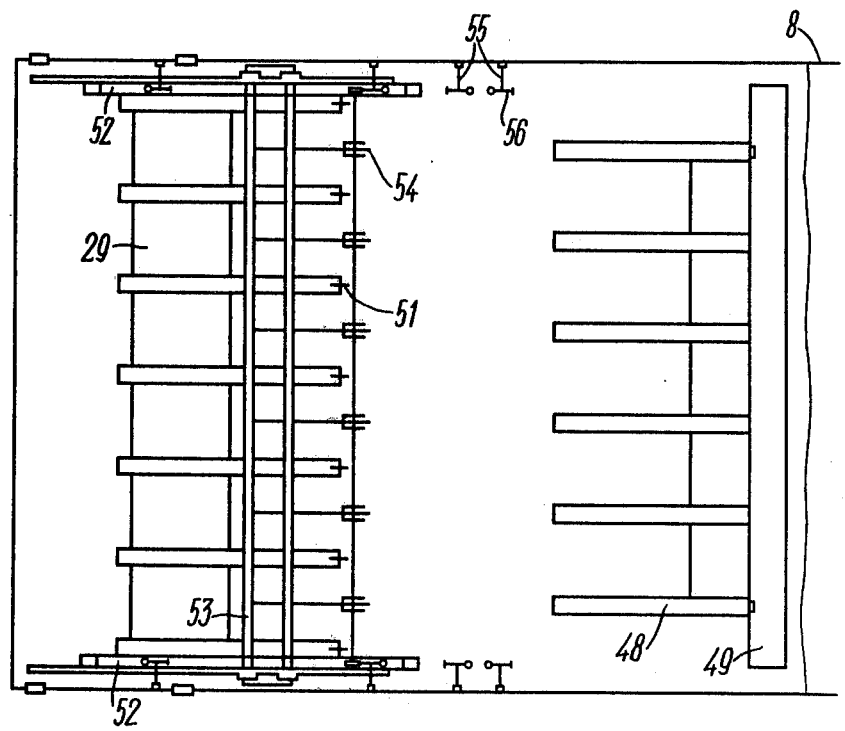
FIG. 5 is a top view of the same as shown in FIG. 4.

The prongs of the trolley 29 have spring-loaded catches 51 (FIG. 5) constructed in such a manner that they can be sunk by the sheets lying on the receiving table 48 and are able to return into the initial position under the fence 49 (FIGS. 4 and 5).

The trolley 29 mounts a carriage 53 and tracers 52 made in the form of two bars attached to the sides of the trolley 29.

On the carriage 53 are vertically mounted ejectors 54 adapted to turn in the direction of the blank feed. The movement of the ejectors 54 in the opposite direction from the vertical position is limited.

Mounted on the frame 8 (FIG. 5) at the sides of the storage arrangement 31 (FIG. 4) are rotatable abutments 55 and 56 (FIGS. 4 and 5) designed to stop the carriage 53 and thereby cause it to move relatively to the trolley during the travel thereof. The abutments 55 stop the carriage 53 during the travel of the trolley to the guillotine shears 6, whereas the abutments 56 stop the carriage 53 during the reverse travel of the trolley.

Alternatively, the frame 8 can be composed of several sections located successively along the axis of the transfer machine and designed for mounting the respective units thereof, viz. the receiving table 9 of the sheet loading arrangement, the supports of the four-member linkwork 10, the feed table 4, and the trolley 29 of the sorting arrangement.

The transfer machine operates as follows:

The initial stack 3 of the sheets to be cut is placed on the receiving table 9. The position of the stack is fixed by means of the fences 11. The separating magnets 12 are brought to the end of the stack.

The data for cutting the sheet according to a combination economy pattern are put into the control system (a sketch illustrating an economy pattern is represented by light lines on the table 9 in FIG. 2). Said data cover the dimensions and number of the blanks, the address of the storage section to which the cut-off blanks are to be directed, the position of the sheet in feeding it to the blades of the shears (lengthwise or crosswise of the feed table), the method of measuring off the dimension of the last blank (from the rearward or forward edge of the sheet), and the dimensions of the edges to be cut if such an operation is required.

All the subsequent operations are performed automatically. On being lowered onto the stack 3, the grip 14 picks up the top sheet and places it onto the feed table 4. The slide 18 begins moving together with the carriage 24 and the grip 25 toward the guillotine shears 6. Just as the sheet gets between the jaws of the grip 25, a signal is emitted for effecting the gripping action and the sheet, while in motion, is brought to the locating surface of the front abutment on the carriage 24.

The passage of the front edge of the sheet by the sensor 26 initiates the dimensioning of the first blank (or edge) and the required number of pulses are sent to the step motor 22. When the dimension is measured off, the sheet is stopped and cut. Thereafter the second blank is dimensioned, then the third one, etc.

The cut-off blanks are fed onto the ribs 33 of the receiving table 28 where like blanks are stored. Then the pneumatic cylinder 41 is put into action in order to cause the pusher 38 to move the stack of cut-off blanks into the zone where it is to be engaged by the abutments 40 on the trolley 29.

The abutments 40 move the blanks off the ribs 33 and the trolley 29 travels to the appropriate storage section in accordance with the programmed address.

The discharge of the blanks into the storage section is also effected by the abutments 40 of the trolley 29.

In a number of cases the movements of the trolley 29 and of the conveyor 37 are effected coincidentally, whereby the cycle time is reduced.

The provision of the receiving table 28 for intermediate storage of the blanks makes it possible to perform all the blank cutting and sorting operations concurrently.

It may be advantageous in a number of cases to cut the last blank by measuring off its dimensions from the rearward edge of this sheet. For the purpose, the remaining portion of the sheet is fed forward until the rearward edge of the sheet passes the sensor 27. Thereafter, during the reverse stroke of the feed mechanism, the sensor 27 responsive to the passage of the rear edge sends out a signal for measuring off the dimension of the last blank corrected for the distance between the guillotine shears 6 and the sensor 27. Then the remnant is cut off from the sheet and removed, whereas the blank continues its movement and is directed into the predetermined section of the storage arrangement 31.

If large blanks (more than 1 m in length) are cut, the trough 32 is brought by the pneumatic cylinders 47 to the guillotine shears 6 and the cut-off blanks go directly into the trough 32.

If small blanks are cut, the trough is moved away from the shears to make sufficient room for the blanks to pass onto the ribs of the receiving table 28.

When cutting small blanks, it is possible to shift the self-propelled platforms 43 along the cutting line in order to place another stack. The shifting of said platforms is also resorted to in unloading the multisection storage arrangement 31.

Figure 6:
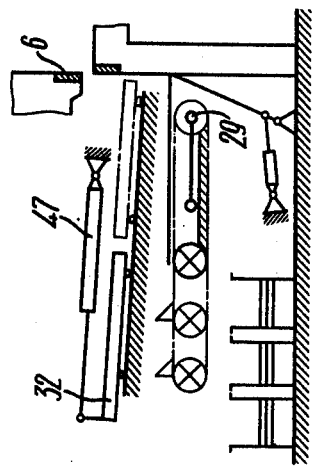
Figure 8:
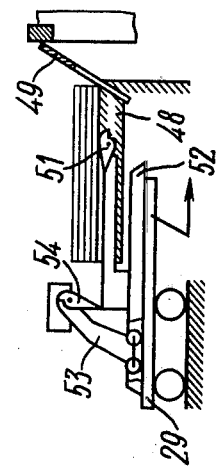
Figure 7:
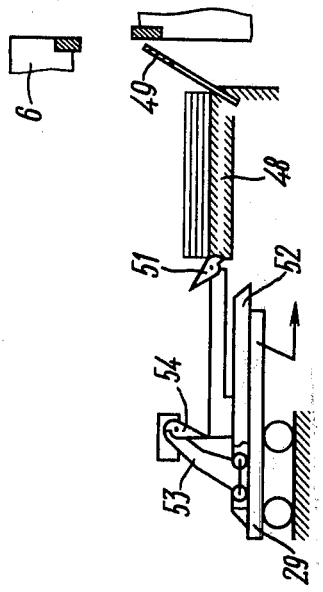

If the other embodiment of the discharge mechanism is employed, the transfer machine operates as follows:

The trolley 29 approaches the stack 3, gets under it and continues further as shown in FIGS. 6, 7 and 8.

In the initial position, the trolley 29 (FIG. 9) is at the guillotine shears 6, the catches 51 are under the fence 49, and the carriage 53 is in the extreme left position on the trolley 29.

All the loading and feeding operations are performed as described previously.

The cut-off blanks drop onto the receiving table 48 (FIG. 10). The trolley 29 starts moving from the guillotine shears 6 and the catches 51 move off the cut blanks from the ribs of the receiving table 48. During further movement the tracers 52 (FIG. 11) come up against the abutments 56 which turn so that the carriage 53 is stopped.

Inasmuch as the trolley 29 (FIG. 12) continues moving, the carriage 53 travels on the trolley 29 into the extreme right position, whereupon the abutments 56 disengage from the tracer 52 and free the carriage 53.

During this movement the ejectors of the carriage 53 turn freely and at the extreme right position they go down and project beyond the ends of the blanks.

When the trolley 29 is moving from the guillotine shears 6, the abutments 55 are turned by the tracers 52 so that they do not prevent the carriage 53 from moving together with the trolley 29, but when the trolley is moving to the shears 6, the abutments 55 stop the carriage 53.

If the blanks are to be discharged, for example, into the last storage section, the trolley 29 receives a reversal signal (from a change-over switch) only after it arrives over the desired section and passes the abutments located thereabove.

Figure 14:
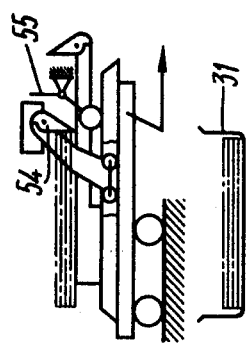
Figure 13:
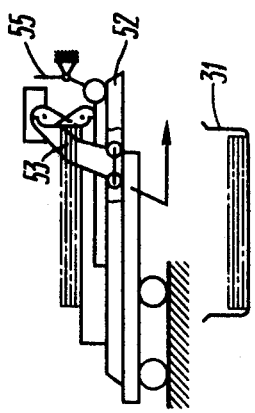
Figure 15:
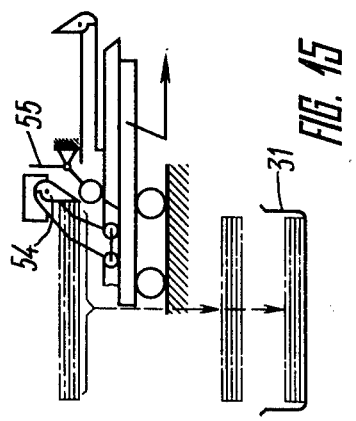

After the trolley 29 is reversed (FIG. 13), the tracers 52 turn the abutments 55 in the opposite direction and in this position they stop the carriage 53. When the trolley 29 moves to the shears (FIGS. 14 and 15), it passes under the blanks which are first retained by the ejectors 54 and then discharged into the sections of the storage arrangement 31.

Figure 16:
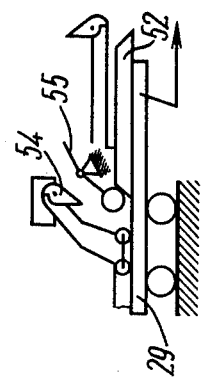

The length of the tracers 52 (FIG. 16) is chosen so that after the blanks are discharged they releases the carriage 53 and it, being in the extreme left position, continues to move together with the trolley 29.

While the blanks are being transported to the predetermined storage section, blanks of another type are continued to be cut and fed onto the receiving table 48. The trolley 29 (FIG. 9) moves to the receiving table to take the newly cut blanks. As the trolley 29 approaches the receiving table 48, its catches 51 are sunk by the blades lying on the table. Farther on, under the fence 49, the catches return into the initial position and project beyond the ends of the blanks.

The abutments 56 do not stop the carriage 53 during the movement of the trolley 29 to the guillotine shears 6, but stop it, as described previously, during the travel of the trolley 29 from the shears.

It is possible not to transport sheet remnants by means of the trolley 29, but to drop them just after cutting into the refuse bin 46, for which purpose the fence 49 is mounted rotatably.

It is claimed:

1. A transfer machine for cutting sheet metal comprising:
   a. a frame with longitudinal members, said frame being composed of several sections located successively along the axis of said machine and designed for mounting respective units thereof;
   b. a sheet-loading arrangement including a first receiving table for sheets fixedly mounted on said frame and located on said axis, and a four-member linkwork having a sheet grip, said linkwork being mounted on said frame via supports secured to said frame;
   c. guillotine shears located on said axis downstream of said first receiving table as viewed in the direction of sheet movement;
   d. a feed table located between said first receiving table and said shears, said linkwork being constructed so as to transfer a sheet from a stack onto said feed table in such a manner that the sheet remains parallel to the plane of said feed table during the transfer, and said feed table being mounted on said frame and being designed to feed a sheet from said first receiving table to said shears;
   e. a first sensor for measuring the dimensions of a blank from the forward edge of a sheet, said first sensor being located near the cutting line of said shears;
   f. a second sensor responsive to the passage of the rearward edge of a sheet and designed to measure the dimensions of a blank from the rearward edge of a sheet, said second sensor being located on said feed table;
   g. a multisection storage arrangement positioned slightly below said longitudinal members;
   h. an arrangement for sorting and stacking cut-off blanks and including a second receiving table for intermediate storage of like blanks located downstreams of said shears and upstream of said storage arrangement as viewed in the direction of sheet movement, a trolley designed to transport like blanks and adapted for movement along said axis on said longitudinal members, and a discharge mechanism on said trolley designed to discharge cut-off blanks into said storage arrangement; and
   i. a system for programmed control of said machine.

2. A transfer machine for cutting sheet metal comprising:
   a. a frame with longitudinal members;
   b. a sheet-loading arrangement including a first receiving table for sheets fixedly mounted on said frame and located on said axis, and a four-member linkwork having a sheet grip, said linkwork being mounted on said frame; to said frame;
   c. guillotine shears located on said axis downstream of said first receiving table as viewed in the direction of sheet movement;
   d. a feed table located between said first receiving table and said shears, said linkwork being constructed so as to transfer a sheet from a stack onto said feed table in such a manner that the sheet remains parallel to the plane of said feed table during the transfer, and said feed table being mounted on said frame and being designed to feed a sheet from said first receiving table to said shears;
   e. a first sensor for measuring the dimensions of a blank from the forward edge of a sheet, said first sensor being located near the cutting line of said shears;
   f. a second sensor responsive to the passage of the rearward edge of a sheet and designed to measure the dimensions of a blank from the rearward edge of a sheet, said second sensor being located on said feed table;
   g. a multisection storage arrangement positioned slightly below said longitudinal members;
   h. an arrangement for sorting and stacking cut-off blanks and including a second receiving table for intermediate storage of like blanks located downstream of said shears and upstream of said storage arrangement as viewed in the direction of sheet movement, a trolley designed to transport like blanks and adapted for movement along said axis on said longitudinal members, and a discharge mechanism on said trolley designed to discharge cut-off blanks into said storage arrangement, said discharge mechanism comprising a number of conveyors located on said trolley and extending parallel to said axis, and said conveyors having carrying elements provided with abutments for moving cut-off blanks from said second receiving table into said storage arrangement, the driving elements of said conveyors being mounted on a common drive shaft for synchronous movement of said conveyors, and said receiving table being constructed in the form of a number of ribs extending parallel to said axis, each of said ribs being hinged at one end thereof to a bed of said shears, and each of said ribs being provided at the other end thereof with rollers adapted to freely bear on said trolley, said discharge mechanism further comprising a pusher constructed in the form of a fork having prongs which fit between said ribs and which extend upwardly to a stationary blade of said shears thereby forming a sloping surface for cut-off blanks to slide down onto said ribs, and said pusher being rotatable for moving the blanks into the zone of action of said abutments, said discharge mechanism also comprising a trough beneath said trolley which is adapted to be moved out and turned so as to direct remnants into said storage arrangement; and i. a system for programmed control of said machine.

3. A transfer machine for cutting sheet metal comprising:
  a. a frame with longitudinal members;
  b. a sheet-loading arrangement including a first receiving table for sheets fixedly mounted on said frame and located on said axis, and a four-member linkwork having a sheet grip, said linkwork being mounted on said frame;
  c. guillotine shears located on said axis downstream of said first receiving table as viewed in the direction of sheet movement;
  d. a feed table located between said first receiving table and said shears, said linkwork being constructed so as to transfer a sheet from a stack onto said feed table in such a manner that the sheet remains parallel to the plane of said feed table during the transfer, and said feed table being mounted on said frame and being designed to feed a sheet from said first receiving table to said shears;
  e. a first sensor for measuring the dimensions of a blank from the forward edge of a sheet, said first sensor being located near the cutting line of said shears;
  f. a second sensor responsive to the passage of the rearward edge of a sheet and designed to measure the dimensions of a blank from the rearward edge of a sheet, said second sensor being located on said feed table;
  g. a multisection storage arrangement positioned slightly below said longitudinal members;
  h. an arrangement for sorting and stacking cut-off blanks and including a second receiving table for intermediate storage of like blanks located downstream of said shears and upstream of said storage arrangement as viewed in the direction of sheet movement, a trolley designed to transport like blanks and adapted for movement along said axis on said longitudinal members, a discharge mechanism on said trolley designed to discharge cut-off blanks into said storage arrangement, and a trough for large blanks above said discharge mechanism, said trough being mounted for movement along said machine substantially parallel to the movement of said trolley, and said trough being movable from a first position at the blades of said shears where said trough receives large blanks to a second position remote from said blades so as to make room for the passage of cut-off blanks onto said second receiving table; and
  i. a system for programmed control of said machine.

4. A transfer machine for cutting sheet metal comprising:
  a. a frame with longitudinal members;
  b. a sheet-loading arrangement including a first receiving table for sheets fixedly mounted on said frame and located on said axis, and a four-member linkwork having a sheet grip, said linkwork being mounted on said frame;
  c. guillotine shears located on said axis downstream of said first receiving table as viewed in the direction of sheet movement;
  d. a feed table located between said first receiving table and said shears, said linkwork being constructed so as to transfer a sheet from a stack onto said feed table in such a manner that the sheet remains parallel to the plane of said feed table during the transfer, and said feed table being mounted on said frame and being designed to feed a sheet from said first receiving table to said shears;
  e. a first sensor for measuring the dimensions of a blank from the forward edge of a sheet, said first sensor being located near the cutting line of said shears;
  f. a second sensor responsive to the passage of the rearward edge of a sheet and designed to measure the dimensions of a blank from the rearward edge of a sheet, said second sensor being located on said feed table;
  g. a multisection storage arrangement positioned slightly below said longitudinal members;
  h. an arrangement for sorting and stacking cut-off blanks and including a second receiving table for intermediate storage of like blanks located downstream of said shears and upstream of said storage arrangement as viewed in the direction of sheet movement, a trolley designed to transport like blanks and adapted for movement along said axis on said longitudinal members, and a discharge mechanism on said trolley designed to discharge cut-off blanks into said storage arrangement, said discharge mechanism comprising a carriage with rotatable ejectors mounted on said trolley for movement relative to said trolley along said axis so as to permit said ejectors to push blanks off said trolley, and said discharge mechanism also comprising a tracer mounted on said trolley and arranged to interact with a number of rotatable abutments located on said frame in the path of said trolley, a first one of said abutments being arranged to stop said carriage during movement of said trolley away from the blades of said shears so as to cause said carriage to move relative to said trolley into an initial position where said ejectors extend beyond the ends of the blanks, and a second one of said abutments being arranged to stop said carriage and thereby cause discharge of the blanks into said storage arrangement during movement of said trolley towards said blades of said shears, said trolley being provided with spring-loaded catches adapted to remove the blanks from said second receiving table and fix the ends of the blanks during movement of said carriage into said initial position on said trolley; and i. a system for programmed control of said machine.

* * * * *